(12) United States Patent
Nagendra et al.

(10) Patent No.: US 7,516,459 B2
(45) Date of Patent: Apr. 7, 2009

(54) METHODS AND APPARATUS TO OPTIMIZE MANAGED APPLICATION PROGRAM INTERFACES

(75) Inventors: Gururaj Nagendra, Hillsboro, OR (US); Stewart Taylor, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 10/783,840

(22) Filed: Feb. 20, 2004

(65) Prior Publication Data

US 2005/0188382 A1    Aug. 25, 2005

(51) Int. Cl.
   *G06F 3/00*  (2006.01)
   *G06F 9/44*  (2006.01)
   *G06F 9/46*  (2006.01)
   *G06F 13/00* (2006.01)

(52) U.S. Cl. ..................... 719/328; 717/168
(58) Field of Classification Search ............. 719/328; 717/140, 148, 168; 718/1
   See application file for complete search history.

(56) References Cited

U.S. PATENT DOCUMENTS

| | | | |
|---|---|---|---|
| 5,339,430 A * | 8/1994 | Lundin et al. | 719/332 |
| 6,332,215 B1 * | 12/2001 | Patel et al. | 717/141 |
| 6,993,750 B2 * | 1/2006 | Hundt et al. | 717/130 |
| 7,146,613 B2 * | 12/2006 | Chauvel et al. | 718/1 |
| 7,158,924 B2 * | 1/2007 | Williams et al. | 703/17 |
| 7,203,941 B2 * | 4/2007 | Demsey et al. | 718/1 |
| 2003/0070161 A1 * | 4/2003 | Wong et al. | 717/148 |
| 2004/0268309 A1 * | 12/2004 | Grover et al. | 717/120 |
| 2005/0172133 A1 * | 8/2005 | Brumme et al. | 713/182 |
| 2005/0172286 A1 * | 8/2005 | Brumme et al. | 718/1 |

FOREIGN PATENT DOCUMENTS

| | | |
|---|---|---|
| EP | 0 945 791 | 9/1999 |
| EP | 1 313 021 | 5/2003 |
| EP | 1313012 A1 * | 5/2003 |
| WO | WO 02/41145 | 5/2002 |

OTHER PUBLICATIONS

International Search Report for PCT application serial No. PCT/US2005/002989, Jun. 30, 2005, 5 pages.
Written Opinion of the International Searching Authority for PCT application serial No. PCT/US2005/002989, Jun. 30, 2005, 8 pages.
Bea Weblogic Jrockit™: *Java for the Enterprise*, Bea Systems, Inc., 2003, 23 pages.
Submitted herewith is a copy an International Report on Patentability for Application Serial No. PCT/US2005/002989, dated Aug. 31, 2006, 10 pages.
PRC Patent Office, "First Office Action," for corresponding Chinese application No. 200580005548.4, mailed on Jul. 27, 2007, (11 pages).
Baker & McKenzie, "Summary of Office Action issued in Chinese application No. 200580005548.4" mailed on Nov. 11, 2007, (3 pages). Note: Attorney privileged communications have been redacted.

* cited by examiner

*Primary Examiner*—Meng-Ai An
*Assistant Examiner*—Qing-Yuan Wu
(74) *Attorney, Agent, or Firm*—Hanley, Flight & Zimmerman LLC.

(57) ABSTRACT

Methods and apparatus to optimized managed application program interfaces are described herein. In an example method, a processor instruction proxy stub (PIPS) associated with one or more processor instructions is generated. Based on the PIPS, an optimized managed application program interface is generated to execute the one or more processor instructions.

19 Claims, 5 Drawing Sheets

(PRIOR ART)

```
LppStatus ownsCompare_16u (const Ipp8u* pSrc1, const Ipp8u* pSrc2, int len, int *pResult {
        int i;
        for (i = 0; i < len; i++){
                if (pSrc1[i] != pSrc2[i]) break;
        } // for
        *pResult = (i < len) ? pSrc1[i] - pSrc2[i] : 0;
        return ippStsNoErr;
} // end of function
```

FIG. 4

```
Public ownsCompare_16u
_TEXT SEGMENT
pSrc1 EQU 12[esp]
pSrc2 EQU 16[esp]
len EQU 20[esp]
pResult EQU 24[esp]
ALIGN 16
; Lib = W7 (code name for P4 optimization)
; Caller = ippsCompare_16u function
ownsCompare_16u PROC NEAR
        push esi
        push edi
;************************************************************
        mov esi, pSrc1
        mov eax, pSrc2
        mov edi, pSrc2
        mov ecx, len
        test ecx, ecx
        jz ResultCmp16u00
;************************************************************
        xor eax, edi
        and eax, 03h
        jnz ShortLoop4Cmp16u00
        test edi, 01h
        jnz ShortLoop4Cmp16u00
        cmp ecx, 8
        jg Align16Cmp16u00
;************************************************************
SSE2ResultCmp16u00:
        xor eax, 0ffffh
        bsf edx, eax
        lea esi, [esi + edx]
        movzx eax, WORD PTR [esi]
        movzx edx, WORD PTR [esi + edi]
        sub eax, edx
        jmp ResultCmp16u01
;************************************************************
AlignResultCmp16u00:
        sub edi, esi
        jmp SSE2ResultCmp16u00
Result16Cmp16u01:
        add    esi, 16
        jmp    SSE2ResultCmp16u00
Result16Cmp16u02:
        add    esi, 32
        jmp    SSE2ResultCmp16u00
Result16Cmp16u03:
        add    esi, 48
        jmp    SSE2ResultCmp16u00
Result16Cmp16u04:
        add    esi, 64
        jmp    SSE2ResultCmp16u00
Result16Cmp16u05:
        add    esi, 80
        jmp    SSE2ResultCmp16u00
ownsCompare_16u ENDP
_TEXT ENDS
```

METHODS AND APPARATUS TO OPTIMIZE MANAGED APPLICATION PROGRAM INTERFACES

TECHNICAL FIELD

The present disclosure relates generally to managed runtime environments, and more particularly, to methods and apparatus to optimize managed application program interfaces (APIs).

BACKGROUND

Managed code is code executing under the control of a managed runtime environment (MRTE) (e.g., any code written in C# ("C-sharp") from Microsoft® or Visual Basic .NET), whereas unmanaged code is code executing outside of the MRTE (e.g., COM components and WIN32 API functions). Typically, managed code may be used to support components and applications during runtime, and unmanaged code may be used to support low-level interaction with the platform (i.e., the processor). As applications migrate toward operability on MRTEs such as Java® Virtual Machine (JVM) and Common Language Runtime (CLR) provided by Microsoft® .NET, virtual machines are abstracting the applications away from processors (i.e., managed runtime applications are becoming more dependent on the virtual machines and less dependent on the processors).

Currently, unmanaged software library functions such as Intel® Integrated Performance Primitives (IPP) are generally optimized for execution in unmanaged environments on processors implemented using one or more of the Intel® Pentium® technology and/or the Intel® Itanium® technology. The unmanaged software library functions may be further optimized to operate on a specific processor architecture by writing custom hand optimization code with processor-specific instructions such as a Streaming Single Instruction/Multiple Data (SIMD) Extension (SSE) instruction, an SSE2 instruction, and/or a MultiMedia Extension (MMX) instruction offered by Intel® processors. For example, a String Compare function may be implemented in unmanaged code and optimized by custom hand optimization coding using the SSE2 instruction. In contrast to unmanaged code, managed code may not be optimized for particular processor architectures in the same way as unmanaged code because no mechanism exists to custom hand optimize managed code. For example, typically, managed APIs are solely dependent on a just-in-time (JIT) compiler for optimization. As a result, managed runtime applications are unable to take advantage of processor-specific optimizing instructions for execution on an underlying processor to enable and optimize features such as audio processing, video processing, image processing, speech recognition, cryptography, etc.

DETAILED DESCRIPTION

Figure 1:
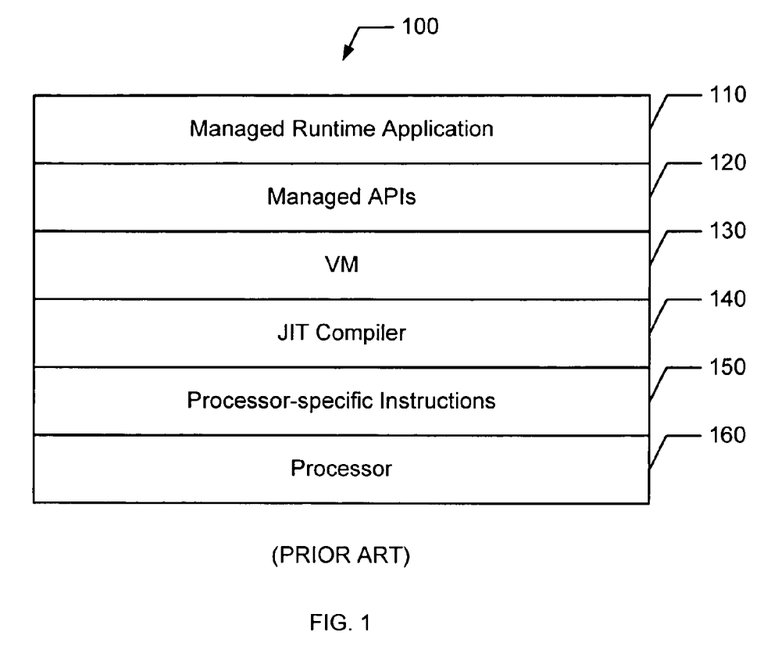
FIG. 1 is a block diagram representation of an example architectural hierarchy of a managed runtime environment (MRTE) system configured in an existing system.

Referring to FIG. 1, an architectural hierarchy of a managed runtime environment (MRTE) system 100 typically includes a managed runtime application 110, one or more managed application program interfaces (APIs) 120, a virtual machine (VM) 130, a compiler 140, processor-specific instructions 150, and a processor 160. As used herein the term "application" refers to one or more methods, programs, functions, routines, or subroutines for manipulating data.

Typically, the managed runtime application 110 is written by programmers to provide various services in an MRTE. The source code of the managed runtime application 110 may be written in, for example, C#, Visual Basic .NET, and/or any other suitable object-oriented programming languages.

The managed APIs 120 such as Microsoft® .NET Framework Class Libraries or Java Class Libraries convert (i.e., compile) the source code of the managed runtime application 110 into Microsoft Intermediate Language (MSIL) code or Java byte code, respectively. The managed APIs 120 serve as an interface between the managed runtime application 110 and the VM 130.

The VM 130 operates an abstract processor to manage the managed runtime application 110 by providing services such as garbage collection, memory management, and code and role-based security to the managed APIs 120. For example, the VM 130, which is processor agnostic, may be a Microsoft Common Language Runtime or a Java Virtual Machine. The managed APIs 120 and the VM 130 operate independent of any specific platform so that the MISL code or the Java byte code is not targeted to any specific processor. Accordingly, the compiler 140 such as a just-in-time (JIT) compiler converts (i.e., re-compiles) the MISL code or the Java byte code from the managed APIs 120 into native assembly code that may be executed by the processor 160.

The processor 160 may be implemented using one or more of the Intel® Pentium® technology, the Intel® Itanium® technology, and/or Intel® Personal Internet Client Architecture (PCA) technology. The processor 160 may be capable of executing processor-specific instructions 150 such as SSE instructions, SSE2 instructions, MMX instructions and/or other suitable instructions to provide software library functions such as cryptography, multimedia, audio codecs, video codecs, image coding, image processing, signal processing, string processing, speech compression, computer vision, etc. to the MRTE system 100.

As mentioned above, however, unmanaged software library functions (i.e., processor-specific instructions 150) may be optimized for the processor 160 whereas managed code (i.e., the managed APIs 120) may not be optimized for certain processor architectures in the same way because previously no mechanism exists to custom-hand optimize managed code functions. That is, the managed APIs 120 corresponding to the managed runtime application 110 were solely dependent on the JIT compiler 140 for optimization and the JIT compiler 140 was incapable of processor-specific optimization. Thus, in prior systems, the underlying processor 160 was not able to take advantage of the services provided by the VM 130, while the managed runtime application 110 was not able to take advantage of the features provided by the underlying processor 160 because the VM 130 did not support certain processor-specific instructions 150 of the underlying processor 160.

Figure 2:
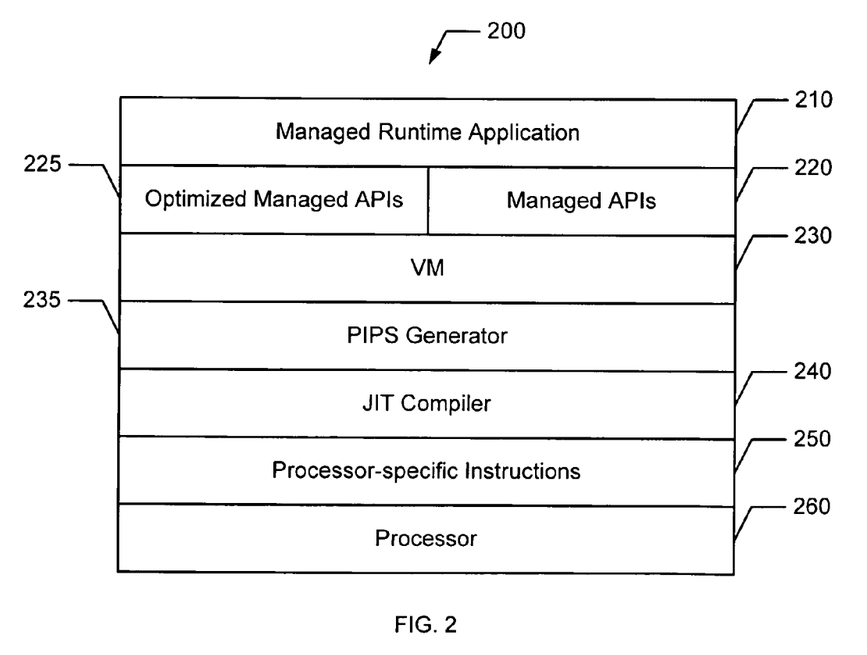
FIG. 2 is a block diagram representation of an example architectural hierarchy of an example MRTE system including a processor instruction proxy stubs (PIPS) system configured in accordance with an embodiment of the teachings of the invention as disclosed herein.

In the example of FIG. 2, an illustrated architectural hierarchy of an MRTE including a processor instruction proxy stub (PIPS) system 200 includes a managed runtime application 210, one or more APIs 220, one or more optimized managed APIs 225, a VM 230, a PIPS generator 235, a compiler 240, processor-specific instructions 250, and a processor 260. As used herein "stub" refers to a portion of dynamically-generated code provided to perform various tasks during execution of a program.

In general, the PIPS generator 235 generates a portion of code or set of instructions referred to as a PIPS (e.g., PIPS 510 of FIG. 5) to optimize execution of the managed runtime application 210 on the underlying processor 260. When the managed runtime application 210 is installed, for example, the PIPS generator 235 generates a PIPS based on the processor-specific instructions 250. Further, the PIPS generator 235 inserts the PIPS into certain managed APIs 220 to create the optimized managed APIs 225 used by the managed runtime application 210. During execution of the managed runtime application 210 as described in detail below, the optimized managed APIs 225 optimize performance of the underlying processor 260 without having to rewrite unmanaged code (i.e., the processor-specific instructions 250) to managed code (i.e., the managed runtime application 210). The optimized managed APIs 225 may be stored in memory (e.g., memory 1030 of FIG. 8) and recalled during execution of the managed runtime application 210 in an MRTE. As a result, the features of the underlying processor 260 may be enabled to optimize performance of the managed runtime application 210 on the underlying processor 260.

While the PIPS generator 235 shown in FIG. 2 is depicted as a separate block within the PIPS system 200, the functions performed by the PIPS generator 235 may be integrated within the VM 230 and/or the JIT compiler 240.

Figure 3:
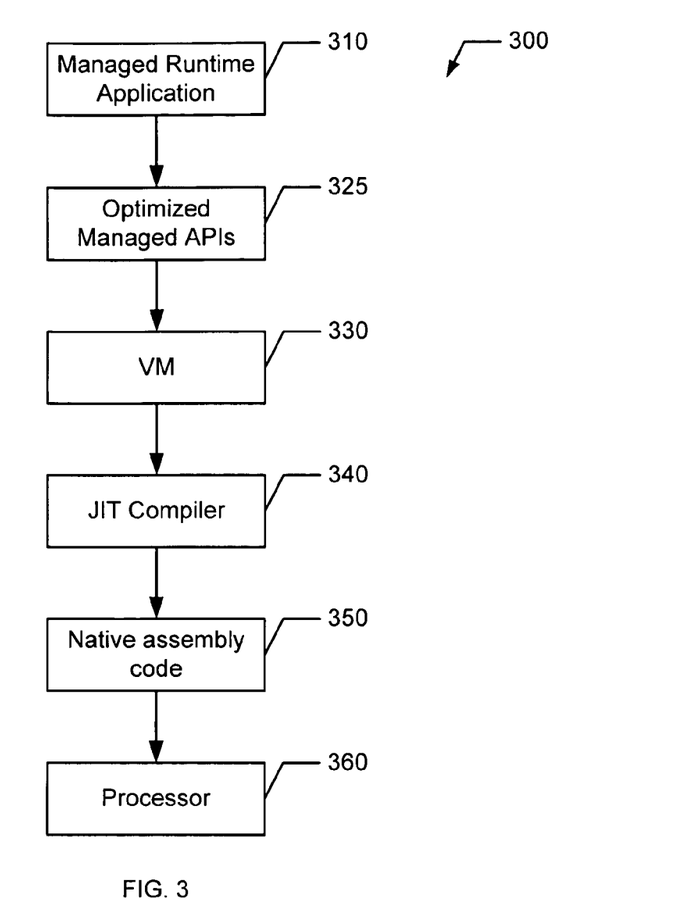
FIG. 3 is a block diagram representation of an example processor instruction proxy stubs (PIPS) system.

Referring to FIG. 3, an example PIPS system 300 includes a managed runtime application 310, one or more optimized managed APIs 325, a VM 330, a JIT compiler 340, native assembly code 350, and a processor 360 to execute the managed runtime application 310 in an MRTE. The VM 330 may execute processor instructions compatible with different processors to execute the managed runtime application 310. Typically, however, the VM 330 may not execute certain processor-specific instructions of the underlying processor 360 to enable features that would otherwise be unavailable without the optimized managed APIs 325. In contrast, during execution of the managed runtime application 310 by the PIPS system 300, for example, the JIT compiler 340 compiles the optimized managed APIs 325 to generate the native assembly code 350 (e.g., the native assembly code 500 of FIG. 5). In particular, the JIT compiler 340 simply compiles and executes the native assembly code 350 without having to optimize the native assembly code 350 any further because the PIPS generator 235 inserted the PIPS to generate the optimized managed APIs 325 during installation of the managed runtime application 310. In other words, the PIPS previously optimized the managed APIs of the managed runtime application 310 (i.e., the optimized managed APIs 325) for the execution of the managed runtime application 310 on the underlying processor 360. Accordingly, the optimized managed APIs 325 optimize performance of the underlying processor 360 without the JIT compiler 340 rewriting unmanaged code (e.g., processor-specific instructions 250 of FIG. 2) to managed code (i.e., the managed runtime application 310). As a result, the native assembly code 350 is customized to optimize performance of the managed runtime application 310 on the underlying processor 360.

Figure 4:
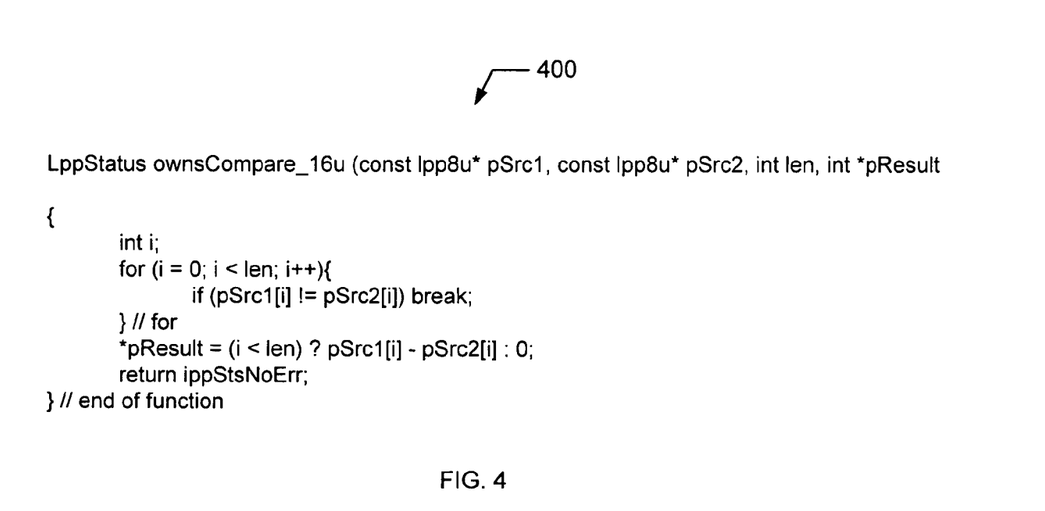
FIG. 4 is a high level language representation of example unmanaged code that may be optimized by an example PIPS system as in FIG. 3.

In the example of FIG. 4, a String Compare function 400 is implemented in unmanaged high-level code. Typically, the String Compare function 400 is optimized as a C language routine by custom-hand optimized coding using processor-specific instructions such as SSE2 instructions for a processor implemented using one or more of the Intel® processing technology mentioned above. However, no mechanism exists to custom-hand optimize managed code such as C# or Java Compare function code for a particular processing architecture.

Figure 5:
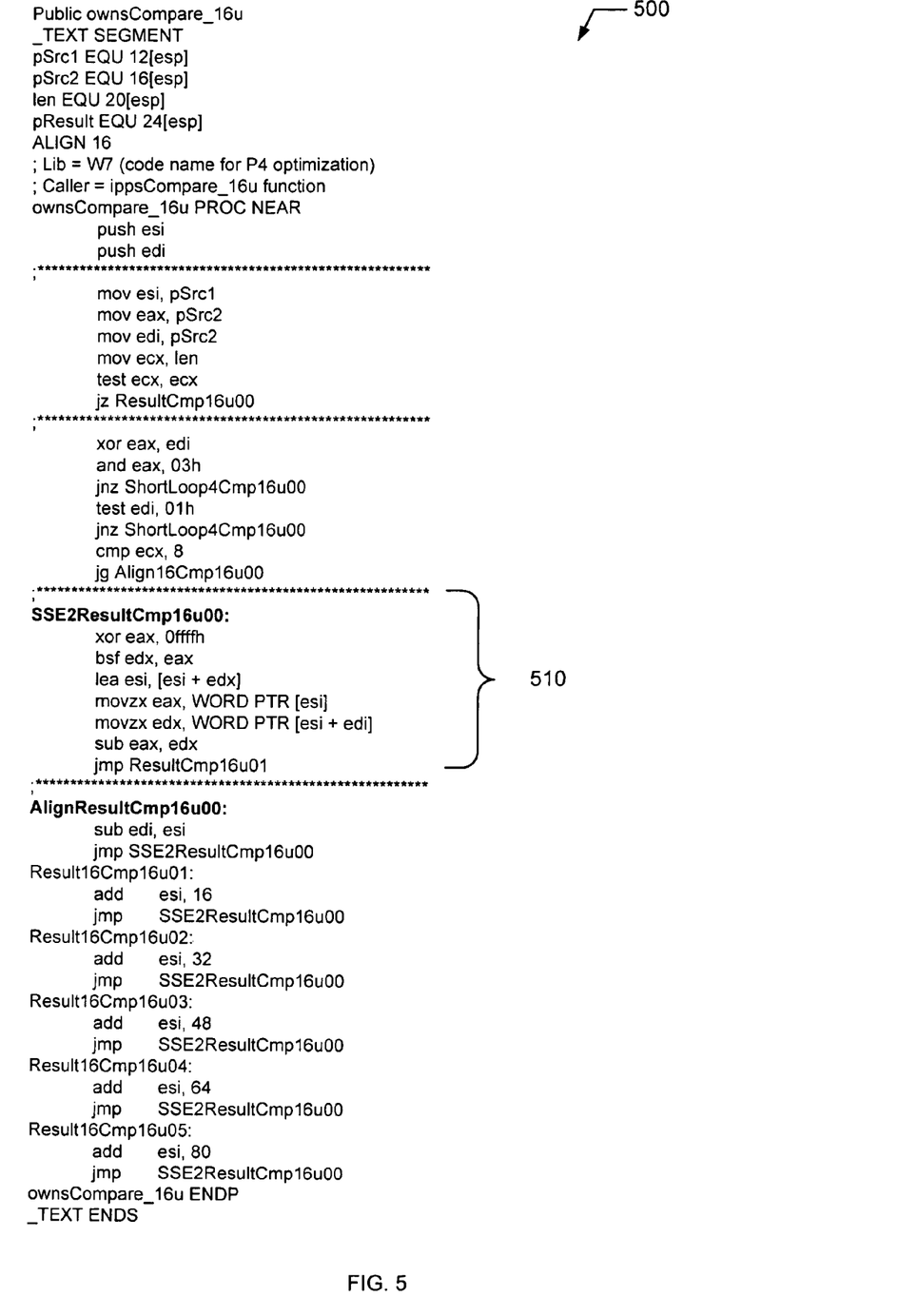
FIG. 5 is a code representation of example native assembly code corresponding to the high level language of FIG. 4 and including a PIPS that optimizes the native assembly code.

As described in conjunction with FIGS. 2 and 3, an example portion of native assembly code 500 including a PIPS 510 to optimize the performance of the String Compare function 400 on the underlying processor 360 is shown in FIG. 5. In particular, the native assembly code 500 includes a PIPS 510 generated by the PIPS generator 235. For example, the PIPS generator 235 may use native marshaling language (ML) code provided by Microsoft® .NET to generate the PIPS 510 during installation of the String Compare function 400. Based on the PIPS 510, the PIPS generator 235 creates the optimized managed APIs 325 corresponding to the managed runtime application 310. The JIT compiler 340 compiles the native assembly code 500 corresponding to the String Compare function, which includes the PIPS 510, as shown in FIG. 5 for the underlying processor 360 to execute. When the String Compare function 400 is initiated during runtime, the VM 330 retrieves the optimized managed APIs 325 for the JIT compiler 340 to generate the native assembly code 500. The JIT compiler 340 compiles and executes optimized managed APIs 325 without having to optimize the optimized managed APIs 325 any further because the PIPS generator 235 previously inserted the PIPS 510 into the optimized managed APIs 325. As a result, the managed runtime application 310 may benefit from both the services provided by the VM 330 (e.g., garbage collection, memory management, and/or code and role-based security) and the features of the underlying processor 360 because the processor-specific instructions 250 (i.e., unmanaged code) of the underlying processor 360 are abstracted up to the VM layer via the PIPS 510. In other words, the optimized managed APIs 325 may enable processor-specific instructions to enable features of the underlying processor 360 to operate the managed runtime applications 310.

Figure 6:
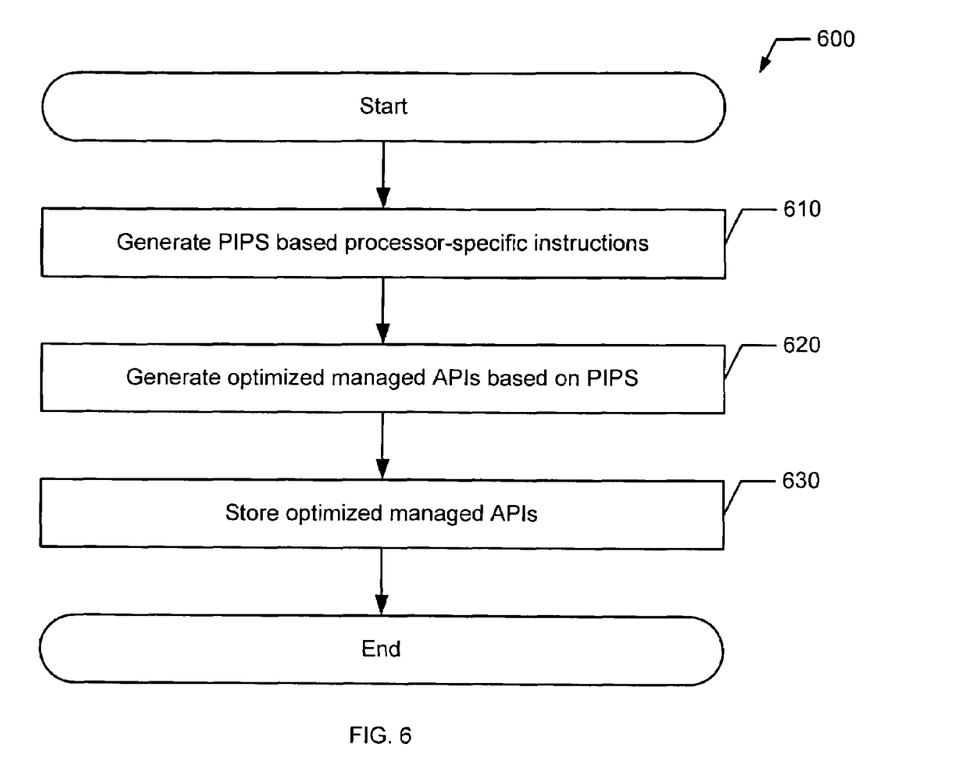
FIGS. 6 and 7 are flow diagram representations of example machine accessible instructions that may be executed to implement an example PIPS system as in FIG. 3.
Figure 7:
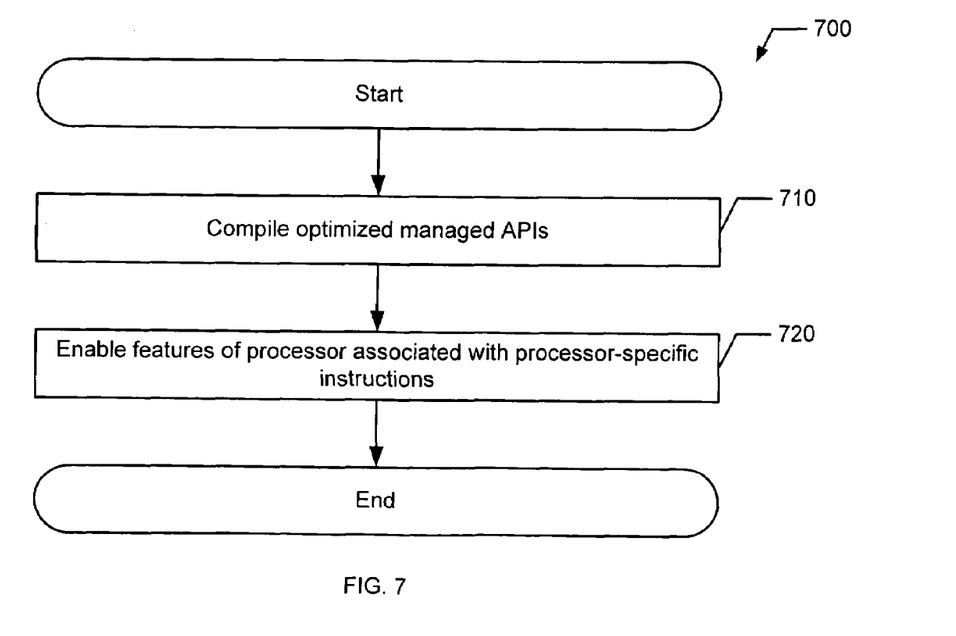

Flow diagrams 600 and 700 representing machine accessible instructions that may be executed by a processor to optimize managed APIs are illustrated in FIGS. 6 and 7, respectively. Persons of ordinary skill in the art will appreciate that the instructions may be implemented in any of many different ways utilizing any of many different programming codes stored on any of many computer-accessible mediums such as a volatile or nonvolatile memory or other mass storage device (e.g., a floppy disk, a CD, and a DVD). For example, the machine accessible instructions may be embodied in a machine-accessible medium such as an erasable programmable read only memory (EPROM), a read only memory (ROM), a random access memory (RAM), a magnetic media, an optical media, and/or any other suitable type of medium. Alternatively, the machine accessible instructions may be embodied in a programmable gate array and/or an application specific integrated circuit (ASIC). Further, although a particular order of actions is illustrated in FIGS. 6 and 7, persons of ordinary skill in the art will appreciate that these actions can be performed in other temporal sequences. Again, the flow diagrams 600 and 700 are merely provided and described in conjunction with FIGS. 2 and 5 as an example of one way to optimize managed APIs.

In the example of FIG. 6, the flow diagram 600 begins with the PIPS generator 235 generating the PIPS 510 associated with processor-specific instructions 250 of the underlying processor 260 (block 610). For example, the PIPS generator 235 may generate the PIPS 510 based on a processor identifier corresponding to the underlying processor 260 during installation of the managed runtime application 210. As noted above, the processor-specific instructions 250 enable features of the underlying processor 260 such as audio processing, video processing, image processing, speech recognition, cryptography, etc. to optimize performance of the managed runtime application 210 on the underlying processor 260 when such features may be otherwise unavailable. Based on the PIPS 510, the PIPS generator 235 generates the optimized managed APIs 225 (block 620). In particular, the PIPS generator 235 inserts the PIPS 510 into certain managed APIs 220 corresponding to the managed runtime application 210. The PIPS generator 235 stores the optimized managed APIs 225 so that the optimized managed APIs 235 may be available for the JIT compiler 240 during execution of the managed runtime application 210 on the underlying processor 260.

In the example of FIG. 7, a flow diagram 700 begins with the JIT compiler 240 compiling and executing the optimized managed APIs 225 corresponding to the managed runtime application 210 (block 710). As noted above, the JIT compiler 240 may compile the optimized managed APIs 225 without further optimizing the optimized managed APIs 225 because the PIPS generator 235 previously inserted the PIPS 510 associated with the processor-specific instructions 250 into the optimized managed APIs 225. That is, the PIPS 510 custom-hand optimizes the managed runtime application 210 to operate on the underlying processor 260 via the optimized managed APIs 225. The JIT compiler 240 enables features of the underlying processor 260 corresponding to the processor-specific instructions 250 (block 640). In addition to services such as garbage collection, memory management, and code and role-based security provided by the VM 230, the managed runtime application 210 may take advantage of the software library functions provided by the optimized managed APIs 225 such as cryptography, multimedia, audio codecs, video codecs, image coding, image processing, signal processing, string processing, speech compression, computer vision, etc. to the managed runtime application 210 during execution on the underlying processor 260. As a result, the managed optimized APIs 225 permit the managed runtime application 210 to execute processor-specific instructions 250 to enable features of the underlying processor 260 that otherwise would be unavailable or inefficient on another processor. Further, the managed optimized APIs 225 custom-hand optimizes performance of the managed runtime application 210 on the underlying processor 260 via the native assembly code 500.

The methods and apparatus disclosed herein are well suited for source code to implementations of the European Computer Management Association (ECMA) Common Language Infrastructure (CLI) (second edition, December 2002) and the ECMA C# language specification (second edition, December 2002). However, persons of ordinary skill in the art will appreciate that the teachings of the disclosure may be applied to source code in other runtime environments.

Figure 8:
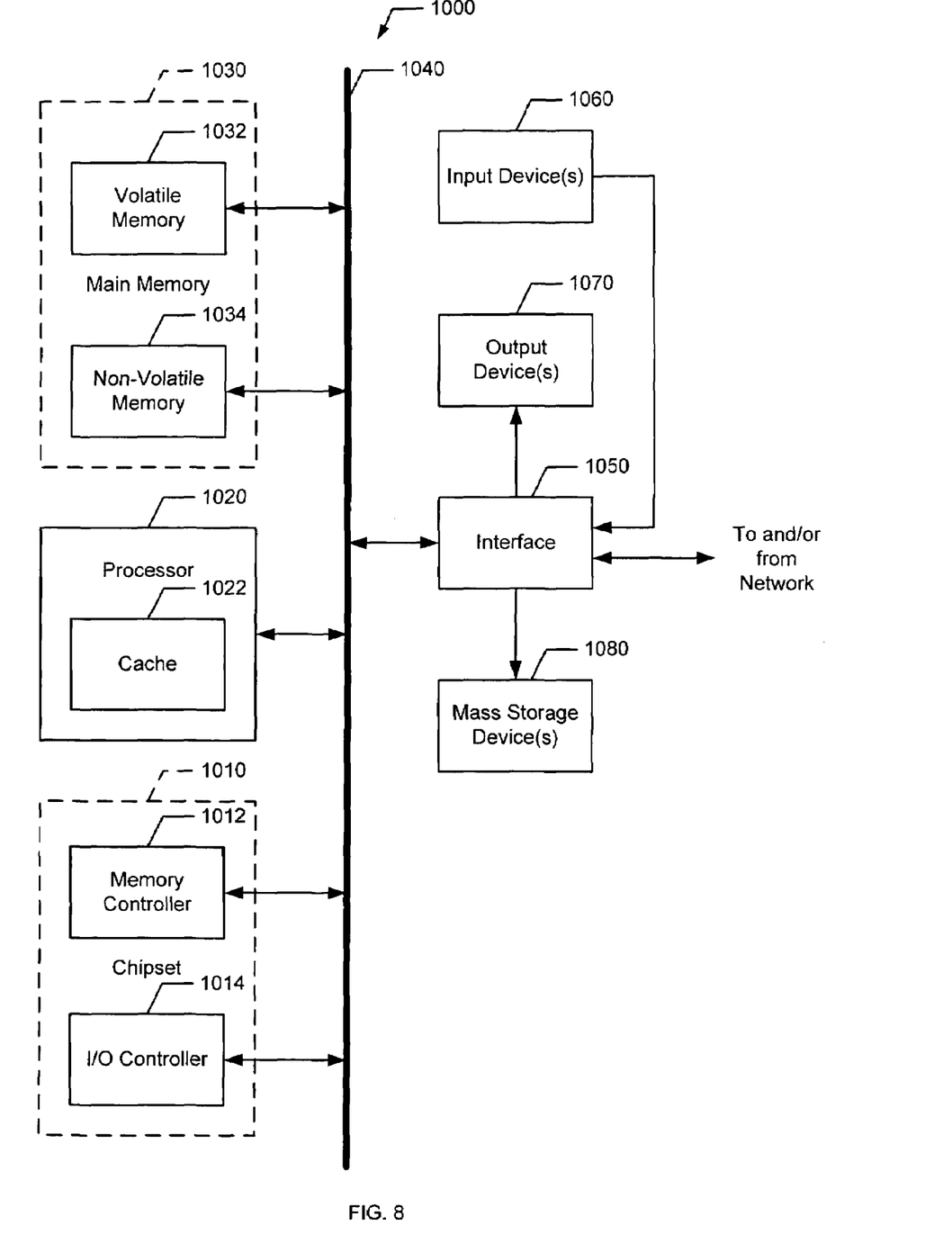
FIG. 8 is a block diagram representation of an example processor system that may be used to implement an example PIPS system as in FIG. 3.

FIG. 8 is a block diagram of an example processor system 1000 adapted to implement the methods and apparatus disclosed herein. The processor system 1000 may be a desktop computer, a laptop computer, a notebook computer, a personal digital assistant (PDA), a server, an Internet appliance or any other type of computing device.

The processor system 1000 illustrated in FIG. 8 includes a chipset 1010, which includes a memory controller 1012 and an input/output (I/O) controller 1014. As is well known, a chipset typically provides memory and I/O management functions, as well as a plurality of general purpose and/or special purpose registers, timers, etc. that are accessible or used by a processor 1020. The processor 1020 is implemented using one or more processors. For example, the processor 1020 may be implemented using one or more of the Intel® Pentium® technology, the Intel® Itanium® technology, Intel® Centrino™ technology, and/or the Intel® XScale® technology. In the alternative, other processing technology may be used to implement the processor 1020. The processor 1020 includes a cache 1022, which may be implemented using a first-level unified cache (L1), a second-level unified cache (L2), a third-level unified cache (L3), and/or any other suitable structures to store data as persons of ordinary skill in the art will readily recognize.

As is conventional, the memory controller 1012 performs functions that enable the processor 1020 to access and communicate with a main memory 1030 including a volatile memory 1032 and a non-volatile memory 1034 via a bus 1040. The volatile memory 1032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 may be implemented using flash memory, Read Only Memory (ROM), Electrically Erasable Programmable Read Only Memory (EEPROM), and/or any other desired type of memory device.

The processor system 1000 also includes an interface circuit 1050 that is coupled to the bus 1040. The interface circuit 1050 may be implemented using any type of well known interface standard such as an Ethernet interface, a universal serial bus (USB), a third generation input/output interface (3GIO) interface, and/or any other suitable type of interface.

One or more input devices 1060 are connected to the interface circuit 1050. The input device(s) 1060 permit a user to enter data and commands into the processor 1020. For example, the input device(s) 1060 may be implemented by a keyboard, a mouse, a touch-sensitive display, a track pad, a track ball, an isopoint, and/or a voice recognition system.

One or more output devices 1070 are also connected to the interface circuit 1050. For example, the output device(s) 1070 may be implemented by display devices (e.g., a light emitting display (LED), a liquid crystal display (LCD), a cathode ray tube (CRT) display, a printer and/or speakers). The interface circuit 1050, thus, typically includes, among other things, a graphics driver card.

The processor system 1000 also includes one or more mass storage devices 1080 to store software and data. Examples of such mass storage device(s) 1080 include floppy disks and drives, hard disk drives, compact disks and drives, and digital versatile disks (DVD) and drives.

The interface circuit 1050 also includes a communication device such as a modem or a network interface card to facilitate exchange of data with external computers via a network. The communication link between the processor system 1000 and the network may be any type of network connection such as an Ethernet connection, a digital subscriber line (DSL), a telephone line, a cellular telephone system, a coaxial cable, etc.

Access to the input device(s) 1060, the output device(s) 1070, the mass storage device(s) 1080 and/or the network is typically controlled by the I/O controller 1014 in a conventional manner. In particular, the I/O controller 1014 performs functions that enable the processor 1020 to communicate with the input device(s) 1060, the output device(s) 1070, the mass storage device(s) 1080 and/or the network via the bus 1040 and the interface circuit 1050.

While the components shown in FIG. 8 are depicted as separate blocks within the processor system 1000, the functions performed by some of these blocks may be integrated within a single semiconductor circuit or may be implemented using two or more separate integrated circuits. For example, although the memory controller 1012 and the I/O controller 1014 are depicted as separate blocks within the chipset 1010, persons of ordinary skill in the art will readily appreciate that the memory controller 1012 and the I/O controller 1014 may be integrated within a single semiconductor circuit.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
    generating a processor instruction proxy stub based on one or more processor instructions not supported by a managed runtime environment;
    inserting the processor instruction proxy stub into a managed application program interface associated with a managed runtime environment to generate an optimized managed application program interface supporting the one or more processor instructions; and
    compiling the optimized managed application program interface including the processor instruction proxy stub using a compiler of the managed runtime environment to generate compiled code,
    wherein generating the processor instruction proxy stub based on the one or more processor instructions comprises generating the processor instruction proxy stub during installation of a managed runtime application and generating the processor instruction proxy stub in response to identifying the processor associated with the one or more processor instructions.

2. A method as defined in claim 1, wherein generating the processor instruction proxy stub associated with the one or more processor instructions comprises generating the processor instruction proxy stub at a layer associated with a virtual machine of the managed runtime environment.

3. A method as defined in claim 1, wherein generating the processor instruction proxy stub associated with the one or more processor instructions comprises generating the processor instruction proxy stub associated with one of a Streaming SIMD Extension (SSE) instruction, an SSE2 instruction, and a MultiMedia Extension instruction.

4. A method as defined in claim 1, wherein generating the processor instruction proxy stub associated with the one or more processor instructions comprises generating the processor instruction proxy stub via marshaling language code of a virtual machine.

5. A method as defined in claim 1, further comprising enabling a feature associated with the one or more processor instructions during execution of the managed runtime application based on the optimized managed application program interface.

6. A machine accessible medium having instructions, which when executed, cause a machine to:
    generate a processor instruction proxy stub based on one or more processor instructions not supported by a managed runtime environment;
    insert the processor instruction proxy stub into a managed application program interface associated with the managed runtime environment to generate an optimized managed application program interface supporting the one or more processor instructions; and
    compile the optimized managed application program interface including the processor instruction proxy stub using a compiler of the managed runtime environment to generate compiled code,
    wherein the instructions cause the machine to generate the processor instruction proxy stub based on the one or more processor instructions by generating the processor instruction proxy stub during installation of a managed runtime application and by generating the processor instruction proxy stub in response to identifying the processor associated with the one or more processor instructions.

7. A machine accessible medium as defined in claim 6, wherein the instructions cause the machine to generate the processor instruction proxy stub associated with the one or more processor instruction by generating the processor instruction proxy stub at a layer associated with a virtual machine of the managed runtime environment.

8. A machine accessible medium as defined in claim 6, wherein the instructions cause the machine to generate the processor instruction proxy stub associated with the one or more processor instructions comprises generating the processor instruction proxy stub associated with one of a Streaming SIMD Extension (SSE) instruction, an SSE2instruction, and a MultiMedia Extension instruction.

9. A machine accessible medium as defined in claim 6, wherein the instructions cause the machine to generate the processor instruction proxy stub associated with one or more processor instructions by generating the processor instruction proxy stub via marshaling language code of a virtual machine.

10. A machine accessible medium as defined in claim 6, wherein the instructions cause the machine to enable a feature associated with the one or more processor instructions for execution of the managed runtime application based on the optimized managed application program interface.

11. A machine accessible medium as defined in claim 6, wherein the machine accessible medium comprises one of a programmable gate array, application specific integrated circuit, erasable programmable read only memory, read only memory, random access memory, magnetic media, and optical media.

12. An apparatus comprising:
    a processor; and
    a memory having stored thereon:

a processor instruction proxy stub generator to generate a processor instruction proxy stub based on one or more processor instructions not supported by a managed runtime environment and to insert the processor instruction proxy stub into a managed application program interface associated with the managed runtime environment to generate an optimized managed application program interface supporting the one or more processor instructions; and a compiler to compile the optimized managed application program interface including the processor instruction proxy stub using a compiler of the managed runtime environment to generate compiled code, wherein the processor instruction proxy stub generator is integrated into one of a virtual machine and the compiler and wherein the processor instruction proxy stub generator identifies a processor associated with the one or more processor instructions to generate the processor instruction proxy stub.

13. An apparatus as defined in claim 12, wherein one or more processor instructions comprise one of a Streaming SIMD Extension (SSE) instruction, an SSE2 instruction, and a MultiMedia Extension instruction.

14. An apparatus as defined in claim 12, wherein the compiler comprises a just-in-time compiler.

15. An apparatus as defined in claim 12, wherein the processor instruction proxy stub is generated at a layer associated with a virtual machine of the managed runtime environment.

16. An apparatus as defined in claim 12, wherein the optimized managed application interface program enables a feature associated with the one or more processor instructions for execution of a managed runtime application.

17. A processor system comprising:

a dynamic random memory (DRAM) to store one or more optimized managed application program interfaces associated with a managed runtime environment; and a processor coupled to the DRAM to generate a processor instruction proxy stub based on one or more processor instructions, to insert native code supporting one or more processor instructions not supported by the managed runtime environment into the one or more managed application program interfaces associated with the managed runtime environment to generate one or more optimized managed application program interfaces, and to compile the one or more optimized managed application program interfaces including the processor instruction proxy stub using a compiler of the managed runtime environment to generate compiled code, wherein the processor instruction proxy stub is generated at a layer associated with a virtual machine of the managed runtime environment and wherein the processor instruction proxy stub is generated during installation of a managed runtime application.

18. A processor system as defined in claim 17, wherein one or more processor instructions comprise one of a Streaming SIMD Extension (SSE) instruction, an SSE2 instruction, and a MultiMedia Extension instruction.

19. A processor system as defined in claim 17, wherein the one or more optimized managed application program interfaces enable a feature associated with the one or more processor instructions during execution of the managed runtime application.

* * * * *